(No Model.)
B. HUNT.
PROCESS OF RECOVERING CYANIDS.
No. 548,058.  Patented Oct. 15, 1895.
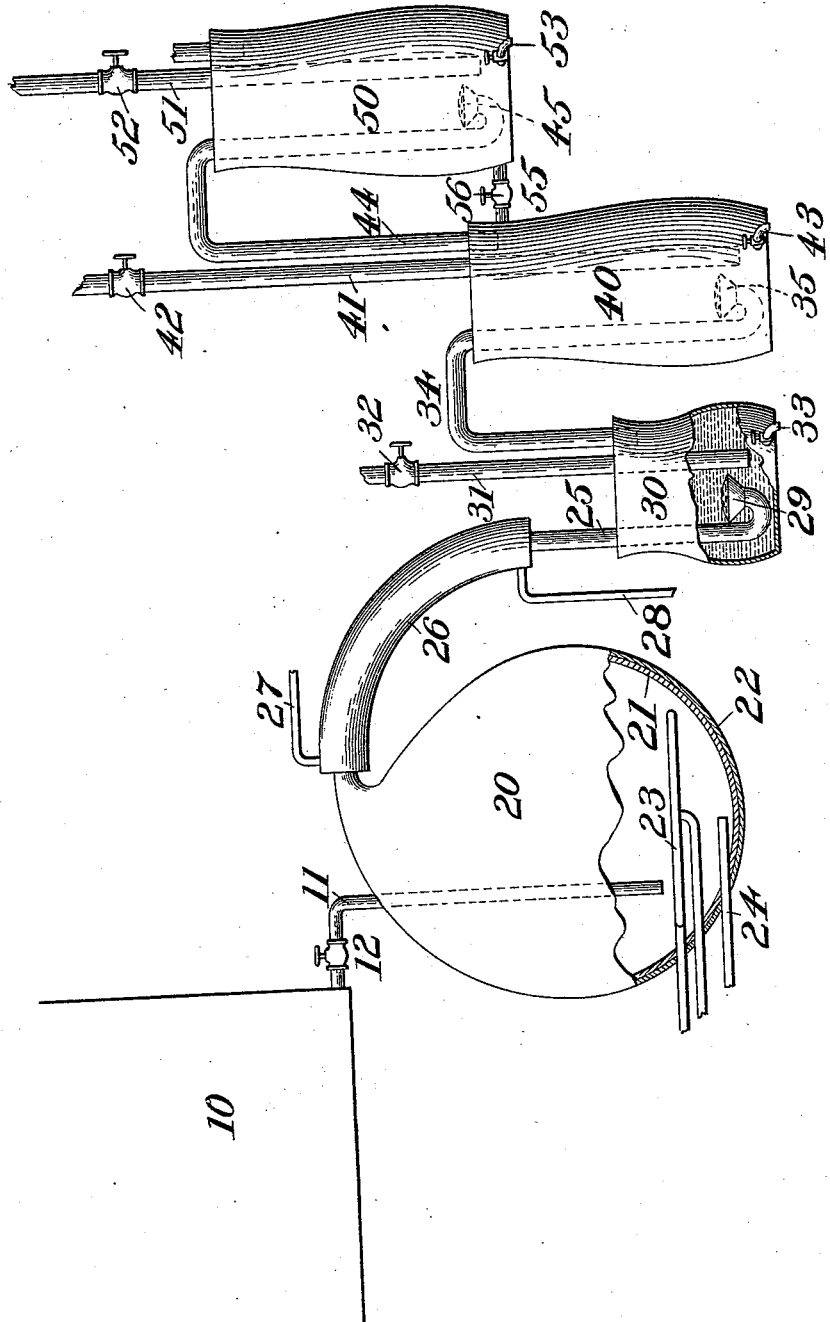
WITNESSES:
S. M. Dorett,
R. E. Somes.
INVENTOR
Bertram Hunt
BY F. C. Somes,
ATTORNEY.

UNITED STATES PATENT OFFICE.

BERTRAM HUNT, OF WICKENBURG, ARIZONA TERRITORY.

PROCESS OF RECOVERING CYANIDS.

SPECIFICATION forming part of Letters Patent No. 548,058, dated October 15, 1895.

Application filed January 21, 1895. Serial No. 535,703. (No specimens.)

*To all whom it may concern:*

Be it known that I, BERTRAM HUNT, a subject of the Queen of Great Britain, residing at Wickenburg, in the county of Maricopa, in the Territory of Arizona, have invented a new and useful Improvement in Processes for the Recovery of Cyanids from Spent Solutions, of which the following is a specification.

This invention relates to the recovery of cyanids from spent cyanid solutions or waste liquors which have been used for the extraction of precious metals from ores.

This process is especially applicable to cyanid liquors which have become foul by the dissolution of base metals contained in the ore, such base metals preventing the perfect precipitation and militating against the further solving power of the liquor.

The object of the invention is to recover the cyanid from these waste or spent liquors in a useful form for further use in the cyanid ore-separating process.

The drawing represents a convenient apparatus for carrying out this process.

A precipitating-tank 10 for containing the spent or waste cyanid solution is constructed of any suitable material and in any desired form, and a pipe 11, having a stop-cock 12, leads out from the bottom or other point in said tank. This tank is provided with an outlet pipe or cock 13 at an elevated point in its side for drawing off the supernatant liquor after precipitation. A still 20, constructed of acid-resisting material, is disposed in a plane below the precipitating-tank 10, and the pipe 11 leading from said tank enters into said still and discharges near the bottom thereof. As the still is not subjected to pressure it may be constructed of an inner lining 21, composed of sheet-lead, the joints of which are autogenously soldered, and an outer casing 22, of wood or other suitable material, surrounding said lining. This still is provided with a steam-coil 23 or with other suitable means for heating. This coil may be a closed coil or it may be perforated, if desired, to admit steam directly to the still; or a simple feed-pipe 24 may supply steam directly to the still for heating purposes. An exit-pipe 25 leads from the top of the still and is bent downward therefrom. This pipe is provided for a portion of its length with a cooling-jacket 26, having an inlet-pipe 27 and an outer pipe 28 for the entrance and exit of cold water or other cooling fluid.

A small wash-tank or wash-bottle 30 for containing a solution of cyanid for removing any carbonic acid gas that may exist in the distillate is disposed adjacent to the still 20, and the exit-pipe 25 leading from said still extends into and discharges near the bottom of this wash-tank or wash-bottle 30. This pipe is provided with a flaring perforated discharge-nozzle 29. Each of the perforations in this nozzle does not exceed one-sixteenth of an inch in diameter, and the aggregate area of these perforations equals the area of the pipe. This tank 30 is provided with a filling-tube 31, having a stop-cock 32, and with an outlet-faucet 33.

A primary absorbing-vessel 40 for containing a caustic alkali for absorbing a portion of the distillate from the still 20 is disposed adjacent to the wash-tank 30, and a pipe 34 leads outward from the top of said wash-bottle 30 and extends downward into said receiving-vessel, discharging near the bottom thereof. This pipe 34 is bent up at its lower end and provided with a flaring perforated nozzle 35, similar to that before described. This absorbing-vessel is provided with a filling-tube 41, having a stop-cock 42 and discharging near the bottom of said vessel. An outlet 43 is disposed near the bottom of said vessel.

A secondary absorbing-vessel 50, similar to the absorbing-vessel 40, is disposed near the latter, and a pipe 44, leading out from the top of the absorbing-vessel 40, extends into the absorbing-vessel 50 and discharges near the bottom thereof, being provided with an upturned lower end having a flaring perforated discharge-nozzle 45, similar to those before described. A filling-tube 51, having a stop-cock 52, opens into the absorbing-vessel 50 near the bottom thereof, and said vessel is provided near its bottom with an outlet-cock 53. This secondary absorbing-vessel is preferably elevated above the plane of the vessel 40 and connected with the latter, and a pipe 55, having a stop-cock 56, connects it with the absorbing-vessel 40, whereby the contents of the vessel 50 may be passed into the vessel 40 at the close of each operation.

A still of from forty to fifty gallons capacity is sufficient for a one-hundred-ton plant. The absorbing-vessels should be of iron and of small diameter in proportion to their height.

In performing the process the spent solution or waste liquor from which the cyanid is to be obtained in a pure state is run into a suitable precipitating-tank, as 10. There is then added to the spent solution or waste liquor a solution of sulfate of zinc containing some free sulfuric acid, and the cyanid in the spent liquor is precipitated in the form of zinc precipitate, which contains all the cyanid present, as double cyanids of zinc, copper, &c., and all the ferro-cyanids, as ferro-cyanid of zinc. The solution is then allowed to settle and the clear supernatant liquor is drawn off through a pipe, as 13, disposed at a proper elevation in the tank. The zinc precipitate obtained as above is then run into a suitable still, as 20. The quantity of hydrocyanic acid which one charge of the still will produce is determined by a laboratory trial. A calculated amount of sulfuric acid sufficient to decompose the cyanid of zinc, plus an excess of sulfuric acid—say twenty or thirty per cent.—is then run into the still, where it mixes with the zinc precipitate contained therein. Heat is then applied to the still and the temperature is raised to a point which is sufficient to vaporize the contents thereof. Low-pressure steam may be used, as even the heat of exhaust-steam is sufficient to bring about the desired reaction. Hydrocyanic acid is formed in the still and passes over through the pipe 25 into the wash-vessel 30, containing a cyanid solution. The cold-water jacket on said pipe 25 condenses any steam that may pass over with said acid, and the water formed therefrom is discharged into the wash-vessel. If such steam were permitted to remain and be passed into the caustic-soda liquid in the absorbing-vessels, it would tend to decompose the cyanid. Under some conditions the zinc may contain a carbonate in the form of carbonate of zinc, or otherwise, and in such case, under the heat of the still, carbonic-acid gas will be given off along with the hydrocyanic acid. It is the function of the cyanid solution in the wash-vessel to remove any carbonic acid which may be so formed. On passing through the wash-vessel 30, containing a cyanid solution, as potassium cyanid, such carbonic acid is absorbed and an equivalent of hydrocyanic acid given off, so that a pure solution of cyanid, free from both caustic and carbonated alkali, can be readily obtained in the subsequent absorbing-vessel, which I have heretofore designated as the "primary absorber." The hydrocyanic acid then passes over from the wash-vessel 30 into the primary absorbing-vessel 40, into which was previously placed enough caustic alkali, either in the form of sodium or potassium hydrate, to combine with a part only—say about sixty-six per cent., more or less—of said hydrocyanic acid, and such a quantity of the acid is absorbed in this primary absorbing-vessel. The remainder of the hydrocyanic acid—say thirty-four per cent., more or less—passes over through the pipe 44 into the second absorbing-vessel 50, which contains a quantity of caustic alkali more than sufficient to satisfy said acid, and it is absorbed. There being no excess of caustic alkali in the first absorbing-vessel 40, a solution of cyanid is formed therein which has no caustic alkali mixed with it, all the caustic alkali which was contained therein having been converted into alkaline cyanid. The pure solution of recovered cyanid is then drawn off from the first absorbing-vessel, and is then ready for use. The partially-saturated solution of caustic alkali in the second absorber 50 is then run into the first absorber, where it is utilized for the next operation. The solution of sulfate of zinc in the still is then drawn off. This solution is very concentrated, and on cooling most of the zinc sulfate crystallizes out and can be used for the next precipitation. The acid mother liquor is returned to the still and utilized for the next charge. Any gold or silver contained in the liquor will be obtained as a residue in the still.

Any suitable form of apparatus adapted for the carrying out of the process may be used for this purpose. The wash-vessel 30 may be dispensed with in some cases and the still connected directly with the primary absorbing-vessel, as 40, the outlet-pipe of the still being in this case made to discharge near the bottom of the absorber.

This process reduces the amount of heat required, as only the small quantity of precipitate contained in the precipitating-tank has to be heated, instead of the whole quantity of the original cyanid solution, and owing to the concentration of the cyanid in the precipitate a small quantity of the acid is sufficient for the operation. Moreover, the process produces a solution of cyanid free from caustic alkali, which is an important point not heretofore obtained in the other recovery processes.

I claim as my invention—

1. The process of recovering cyanid from a spent or waste cyanid liquor, which consists in precipitating the cyanid in said liquor by adding thereto a solution of sulfate of zinc containing some free sulfuric acid, whereby a cyanid precipitate is obtained; then drawing off the supernatant liquor; then mixing with said precipitate a quantity of sulfuric acid more than sufficient to decompose the cyanid of zinc contained in said precipitate, then subjecting the mixture to a distilling operation in bringing the distillate into contact successively with two absorbing solutions, the first of which contains sufficient alkali to combine with a part only of the hydrocyanic acid of said distillate, and the second solution containing an excess of caustic alkali for absorbing the remainder of said acid.

2. The process of recovering cyanid from a spent or waste cyanid liquor, which consists in precipitating the cyanid in said liquor by adding thereto a solution of sulfate of zinc containing some free sulfuric acid, whereby a cyanid precipitate is obtained, then drawing off the supernatant liquor; then mixing with said precipitate a quantity of sulfuric acid more than sufficient to decompose the cyanid of zinc contained in said precipitate, then subjecting the mixture to a distilling operation, then passing the distillate through a washing solution, and then passing the distillate into contact successively with two absorbing solutions, the first containing sufficient caustic alkali to combine with a part only of the hydrocyanic acid of said distillate, and the second solution containing an excess of caustic alkali for absorbing the remainder of said acid.

BERTRAM HUNT.

Witnesses:
JOHN C. SMITH,
HENRY D. UNDERWOOD.